United States Patent
Tsou et al.

(10) Patent No.: US 9,843,264 B2
(45) Date of Patent: Dec. 12, 2017

(54) CONTROLLER OF A POWER CONVERTER AND OPERATION METHOD THEREOF

(71) Applicant: Leadtrend Technology Corp., Hsin-Chu (TW)

(72) Inventors: Ming-Chang Tsou, Hsin-Chu (TW); Meng-Jen Tsai, Hsin-Chu (TW)

(73) Assignee: Leadtrend Technology Corp., Hsinchu (TW)

( * ) Notice: Subject to any disclaimer, the term of this patent is extended or adjusted under 35 U.S.C. 154(b) by 0 days.

(21) Appl. No.: 15/058,167

(22) Filed: Mar. 2, 2016

(65) Prior Publication Data

US 2016/0285376 A1  Sep. 29, 2016

Related U.S. Application Data

(60) Provisional application No. 62/138,993, filed on Mar. 27, 2015.

(51) Int. Cl.
*H02M 3/335* (2006.01)
*H02M 1/00* (2006.01)
*H02M 1/32* (2007.01)

(52) U.S. Cl.
CPC .......... *H02M 3/33523* (2013.01); *H02M 1/32* (2013.01); *H02M 2001/0009* (2013.01); *H02M 2001/0048* (2013.01); *Y02B 70/1491* (2013.01)

(58) Field of Classification Search
CPC ......... H02M 3/33523; H02M 3/33507; H02M 3/33515; H02M 3/33546; H02M 3/33553
See application file for complete search history.

(56) References Cited

U.S. PATENT DOCUMENTS

2011/0149612 A1*  6/2011  Yeh ................... H02M 3/33507
                                                                363/21.09
2014/0043876 A1*  2/2014  Tsou ....................... H02M 7/04
                                                                     363/78

FOREIGN PATENT DOCUMENTS

TW          M288055          2/2006

\* cited by examiner

*Primary Examiner* — Adolf Berhane
*Assistant Examiner* — Afework Demisse
(74) *Attorney, Agent, or Firm* — Winston Hsu (57) ABSTRACT

A controller of a power converter includes a sample-and-hold unit and an adjustment unit, wherein the power converter is applied to a Universal Serial Bus power delivery adapter system. The sample-and-hold unit is used for sampling a voltage to generate a sampling voltage during each period of a gate control signal, wherein the sampling voltage corresponds to an output voltage of the power converter. The adjustment unit is coupled to the sample-and-hold unit for adjusting at least one of a frequency of the gate control signal, a current flowing through a primary side of the power converter, and a resistance of a compensation resistor of the controller according to the sampling voltage.

14 Claims, 10 Drawing Sheets

CONTROLLER OF A POWER CONVERTER AND OPERATION METHOD THEREOF

CROSS REFERENCE TO RELATED APPLICATIONS

This application claims the benefit of U.S. Provisional Application No. 62/138,993, filed on Mar. 27, 2015 and entitled "USB PD Solutions," the contents of which are incorporated herein by reference.

BACKGROUND OF THE INVENTION

1. Field of the Invention

The present invention relates to a controller of a power converter and an operation method thereof, and particularly to a controller and an operation method thereof that can adjust at least one of conversion efficiency of a power converter, a current value corresponding to over-current protection of the power converter, and stability of the power converter with an output voltage of the power converter accordingly.

2. Description of the Prior Art

Figure 1:
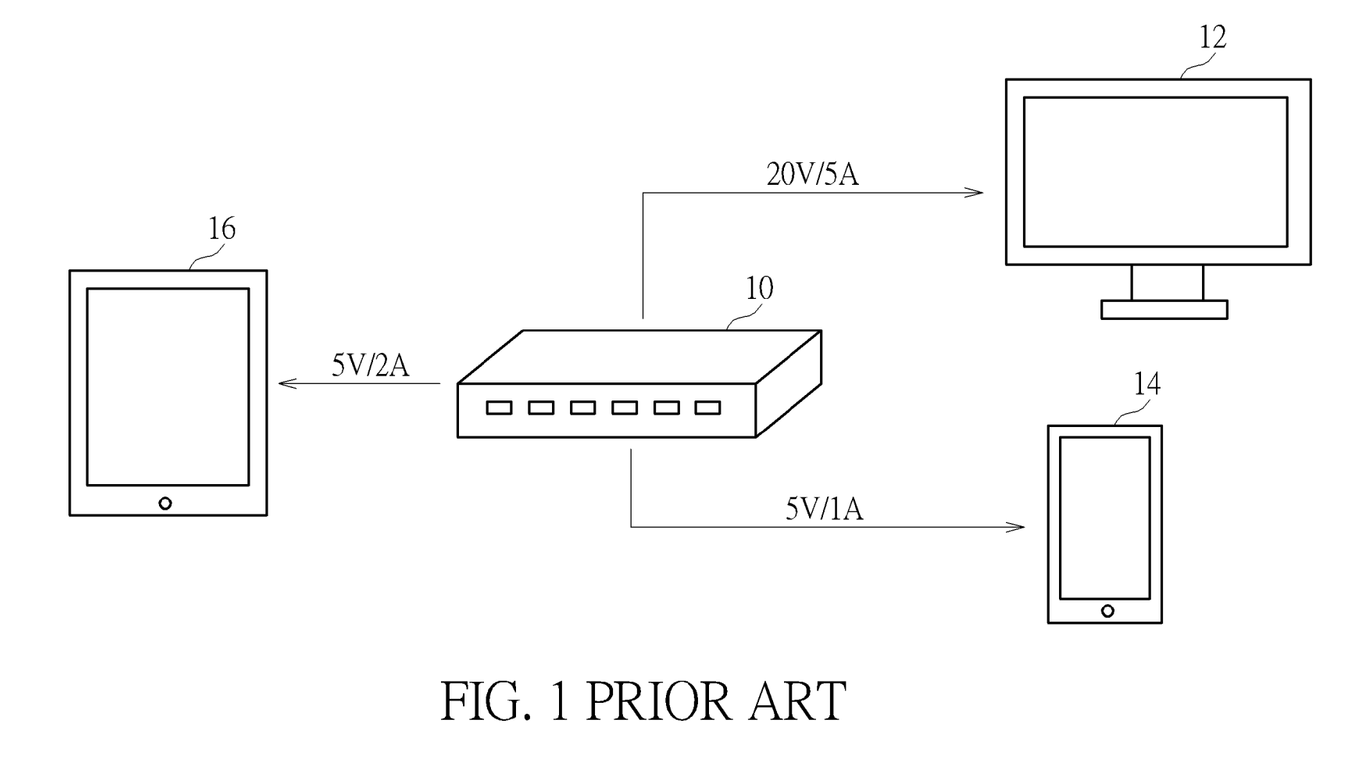
FIG. 1 is a diagram illustrating the Universal Serial Bus power delivery adapter system providing different charging conditions to various consumer electronic products.

In the prior art, a Universal Serial Bus (USB) type C power delivery adapter system 10 (as shown in FIG. 1) can provide different charging conditions to various consumer electronic products through a power converter (not shown in FIG. 1) included in the power delivery adapter system 10. For example, as shown in FIG. 1, the power delivery adapter system 10 can provide 20V voltage and 5 A current to charge a liquid crystal display 12, provide 5V voltage and 1 A current to charge a smart phone 14, and provide 5V voltage and 2 A current to charge a tablet computer 16. That is to say, a secondary side of the power converter needs to output different charging conditions (e.g. 20V/5 A, 5V/1 A, 5V/2 A) to various consumer electronic products. Because the secondary side of the power converter needs to output different charging conditions, if a frequency of a gate control signal controlling a power switch of a primary side of the power converter, a current value corresponding to over-current protection of the power converter, and a direct current (DC) gain of the power converter are not changed with an output voltage of the secondary side of the power converter, the power converter may have lower conversion efficiency, worse the over-current protection of the power converter, and poorer stability. Therefore, how to increase the conversion efficiency and the stability of the power converter, and improve the over-current protection of the power converter becomes an important issue for a user.

SUMMARY OF THE INVENTION

An embodiment of the present invention provides a controller of a power converter, wherein the power converter is applied to a Universal Serial Bus (USB) power delivery adapter system. The controller includes a sample-and-hold unit and an adjustment unit. The sample-and-hold unit is used for sampling a voltage to generate a sampling voltage during each period of a gate control signal, wherein the sampling voltage corresponds to an output voltage of the power converter. The adjustment unit is coupled to the sample-and-hold unit for adjusting at least one of a frequency of the gate control signal, a current flowing through a primary side of the power converter, and a resistance of a compensation resistor of the controller according to the sampling voltage.

Another embodiment of the present invention provides an operation method of a controller of a power converter, wherein the power converter is applied to a USB power delivery adapter system, and the controller includes a sample-and-hold unit and an adjustment unit. The operation method includes the sample-and-hold unit sampling a voltage to generate a sampling voltage during each period of a gate control signal, wherein the sampling voltage corresponds to an output voltage of the power converter; and the adjustment unit adjusting at least one of a frequency of the gate control signal, a current flowing through a primary side of the power converter, and a resistance of a compensation resistor of the controller according to the sampling voltage.

The present invention provides a controller of a power converter and an operation method thereof. The controller and the operation method utilize a sample-and-hold unit to generate a sampling voltage changed with an output voltage of the power converter accordingly, and utilize an adjustment unit to adjust at least one of a frequency of a gate control signal, a current flowing through a primary side of the power converter, and a resistance of a compensation resistor of the controller according to the sampling voltage. Therefore, compared to the prior art, the present invention can adjust at least one of conversion efficiency of the power converter, a current value corresponding to over-current protection of the power converter, and stability of the power converter with the output voltage of the power converter accordingly These and other objectives of the present invention will no doubt become obvious to those of ordinary skill in the art after reading the following detailed description of the preferred embodiment that is illustrated in the various figures and drawings.

DETAILED DESCRIPTION

Figure 2:
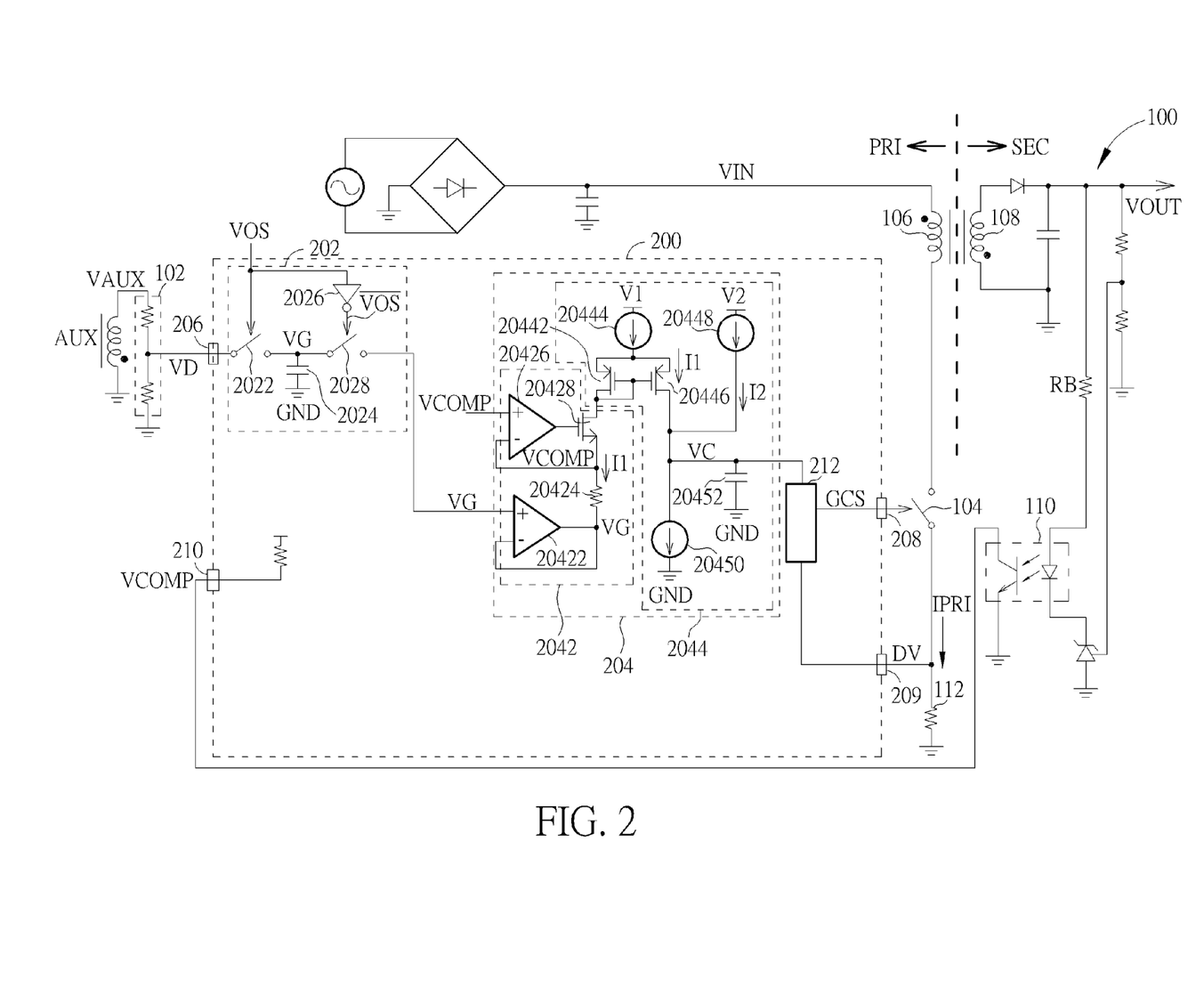
FIG. 2 is a diagram illustrating a controller of a power converter according to a first embodiment of the present invention.
Figure 3:
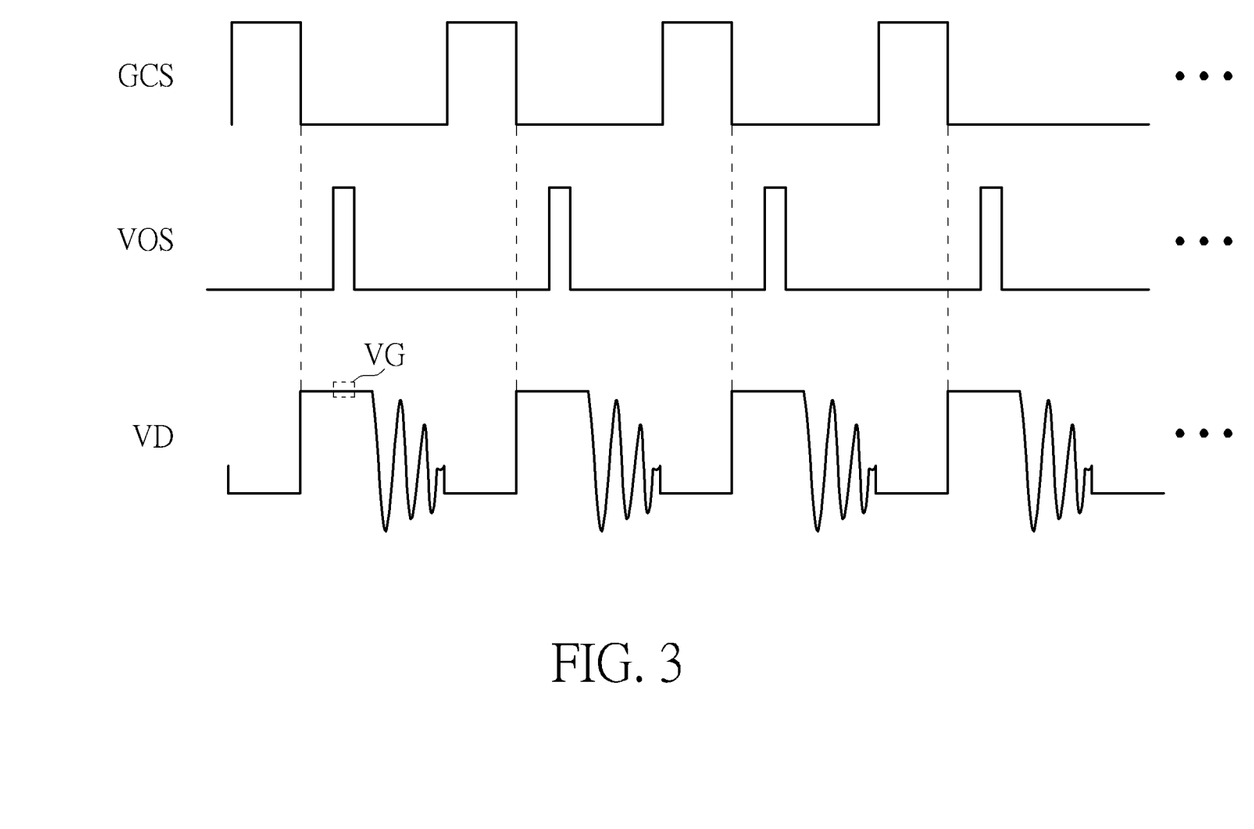
FIG. 3 is a diagram illustrating the timings of the gate control signal, the pulse signal, and the voltage.
Figure 4:
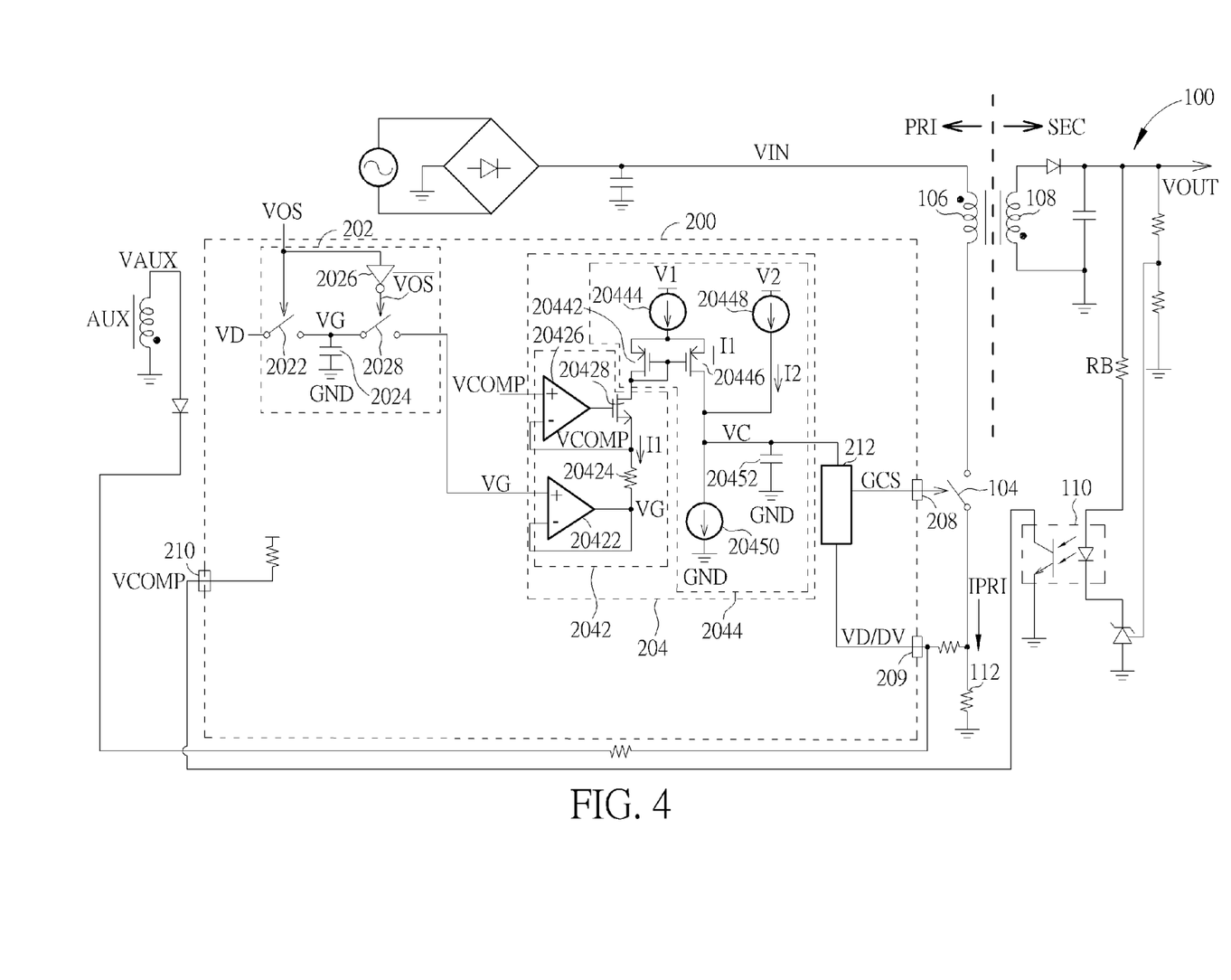
FIG. 4 is a diagram illustrating the sample-and-hold unit receiving the voltage corresponding to the auxiliary voltage of the primary side of the power converter through the current detection pin of the controller.

Please refer to FIG. 2. FIG. 2 is a diagram illustrating a controller 200 of a power converter 100 according to a first embodiment of the present invention, wherein the power converter 100 is applied to a Universal Serial Bus (USB) type C power delivery adapter system (wherein the USB type C power delivery adapter system is not shown in FIG. 2). As shown in FIG. 2, the controller 200 includes a sample-and-hold unit 202 and an adjustment unit 204, wherein the adjustment unit 202 is coupled to the sample-and-hold unit 204. The sample-and-hold unit 202 is used for sampling a voltage VD to generate a sampling voltage VG (as shown in FIG. 3) according to a pulse signal VOS during each period of a gate control signal GCS, wherein the sample-and-hold unit 202 receives the voltage VD from a voltage divider 102 coupled to an auxiliary winding AUX of a primary side PRI of the power converter 100 through an auxiliary pin 206 of the controller 200, the voltage VD corresponds to an auxiliary voltage VAUX of the auxiliary winding AUX, the auxiliary voltage VAUX corresponds to an output voltage VOUT of a secondary side SEC of the power converter 100 (that is, the voltage VD also corresponds to the output voltage VOUT of the secondary side SEC of the power converter 100), and timings of the gate control signal GCS, the pulse signal VOS, and the voltage VD can refer to FIG. 3. Because the voltage VD corresponds to the output voltage VOUT of the power converter 100, the sampling voltage VG also corresponds to the output voltage VOUT of the power converter 100. In addition, the gate control signal GCS is transmitted to a power switch 104 of the primary side PRI of the power converter 100 through a gate pin 208 of the controller 200 to control turning on and turning off of the power switch 104. In addition, as shown in FIG. 4, in another embodiment of the present invention, the sample-and-hold unit 202 receives the voltage VD through a current detection pin 209 of the controller 200 during disabling of the gate control signal GCS (that is, the current detection pin 209 of the controller 200 is further used for receiving a detection voltage DV during enabling of the gate control signal GCS, wherein the detection voltage DV is determined by a current IPRI flowing through the power switch 104 of the primary side PRI of the power converter 100 and a resistor 112), wherein as shown in FIG. 4, the voltage VD corresponds to the auxiliary voltage VAUX of the auxiliary winding AUX of the primary side PRI of the power converter 100, and the auxiliary voltage VAUX corresponds to the output voltage VOUT of the secondary side SEC of the power converter 100.

As shown in FIG. 2, the sample-and-hold unit 202 includes a first switch 2022, a first capacitor 2024, an inverter 2026, and a second switch 2028. The first switch 2022 has a first terminal, a second terminal, and a third terminal, wherein the first terminal of the first switch 2022 is coupled to the auxiliary pin 206, the second terminal of the first switch 2022 is used for receiving the pulse signal VOS, and when the first switch 2022 is turned on according to the pulse signal VOS, the first switch 2022 can sample the voltage VD to generate the sampling voltage VG according to the pulse signal VOS (as shown in FIG. 3); the first capacitor 2024 has a first terminal and a second terminal, wherein the first terminal of the first capacitor 2024 is coupled to the third terminal of the first switch 2022, the second terminal of the first capacitor 2024 is coupled to ground GND, and the first capacitor 2024 is used for stabilizing the sampling voltage VG. The inverter 2026 has a first terminal and a second terminal, wherein the first terminal of the inverter 2026 is used for receiving the pulse signal VOS, and the second terminal of the inverter 2026 is used for outputting an inverse pulse signal $\overline{VOS}$. The second switch 2028 has a first terminal, a second terminal, and a third terminal, wherein the first terminal of the second switch 2028 is coupled to the third terminal of the first switch 2022 for receiving the sampling voltage VG, the second terminal of the second switch 2028 is used for receiving the inverse pulse signal $\overline{VOS}$, and when the second switch 2028 is turned on according to the inverse pulse signal $\overline{VOS}$, the third terminal of the second switch 2028 is used for outputting the sampling voltage VG.

As shown in FIG. 2, the adjustment unit 204 includes a current generation module 2042 and a control voltage generation module 2044, wherein the current generation module 2042 includes a first operational amplifier 20422, a resistor 20424, a second operational amplifier 20426, and a first N type metal-oxide-semiconductor transistor 20428. The first operational amplifier 20422 has a first input terminal, a second input terminal, and an output terminal, wherein the first input terminal of the first operational amplifier 20422 is coupled to the third terminal of the second switch 2028 for receiving the sampling voltage VG, the second input terminal of the first operational amplifier 20422 is coupled to the output terminal of the first operational amplifier 20422, and the first operational amplifier 20422 can make potential of the output terminal of the first operational amplifier 20422 be equal to the sampling voltage VG when the first operational amplifier 20422 operates normally. The resistor 20424 has a first terminal and a second terminal, wherein the first terminal of the resistor 20424 id coupled to the output terminal of the first operational amplifier 20422. The second operational amplifier 20426 has a first input terminal, a second input terminal, and an output terminal, wherein the first input terminal of the second operational amplifier 20426 is used for receiving a compensation voltage VCOMP through a compensation pin 210 of the controller 200, the second input terminal of the second operational amplifier 20426 is coupled to the first terminal of the resistor 20424, and the second operational amplifier 20426 can make potential of the second input terminal of the second operational amplifier 20426 be equal to the compensation voltage VCOMP when the second operational amplifier 20426 operates normally. The first N type metal-oxide-semiconductor transistor 20428 has a first terminal, a second terminal, and a third terminal, wherein the second terminal of the first N type metal-oxide-semiconductor transistor 20428 is coupled to the output terminal of the second operational amplifier 20426, and the third terminal of the first N type metal-oxide-semiconductor transistor 20428 is coupled to the second input terminal of the second operational amplifier 20426. As shown in FIG. 2, when the first operational amplifier 20422 and the second operational amplifier 20426 operate normally, the resistor 20424 can determine a corresponding current I1 flowing through the first N type metal-oxide-semiconductor transistor 20428 according to the compensation voltage VCOMP and the sampling voltage VG wherein because the sampling voltage VG corresponds to the output voltage VOUT of the power converter 100, the corresponding current I1 is also changed with the output voltage VOUT of the power converter 100 accordingly.

As shown in FIG. 2, the control voltage generation module 2044 includes a first P type metal-oxide-semiconductor transistor 20442, a first current source 20444, a second P type metal-oxide-semiconductor transistor 20446, a second current source 20448, a third current source 20450, and a second capacitor 20452. The first P type metal-oxidesemiconductor transistor 20442 has a first terminal, a second terminal, and a third terminal, wherein the second terminal of the first P type metal-oxide-semiconductor transistor 20442 is coupled to the third terminal of the first P type metal-oxide-semiconductor transistor 20442. The second P type metal-oxide-semiconductor transistor 20446 has a first terminal, a second terminal, and a third terminal, wherein the second terminal of the second P type metal-oxide-semiconductor transistor 20446 is coupled to the second terminal of the first P type metal-oxide-semiconductor transistor 20442. The first current source 20444 has a first terminal and a second terminal, wherein the first terminal of the first current source 20444 is used for receiving a first voltage V1, and the second terminal of the first current source 20444 is coupled to the first terminal of the first P type metal-oxide-semiconductor transistor 20442 and the first terminal of the second P type metal-oxide-semiconductor transistor 20446. As shown in FIG. 2, because the first P type metal-oxide-semiconductor transistor 20442, the first current source 20444, and the second P type metal-oxide-semiconductor transistor 20446 form a current mirror, a current flowing through the first P type metal-oxide-semiconductor transistor 20442 and a current flowing through the second P type metal-oxide-semiconductor transistor 20446 are all equal to the corresponding current I1.

Figure 5:
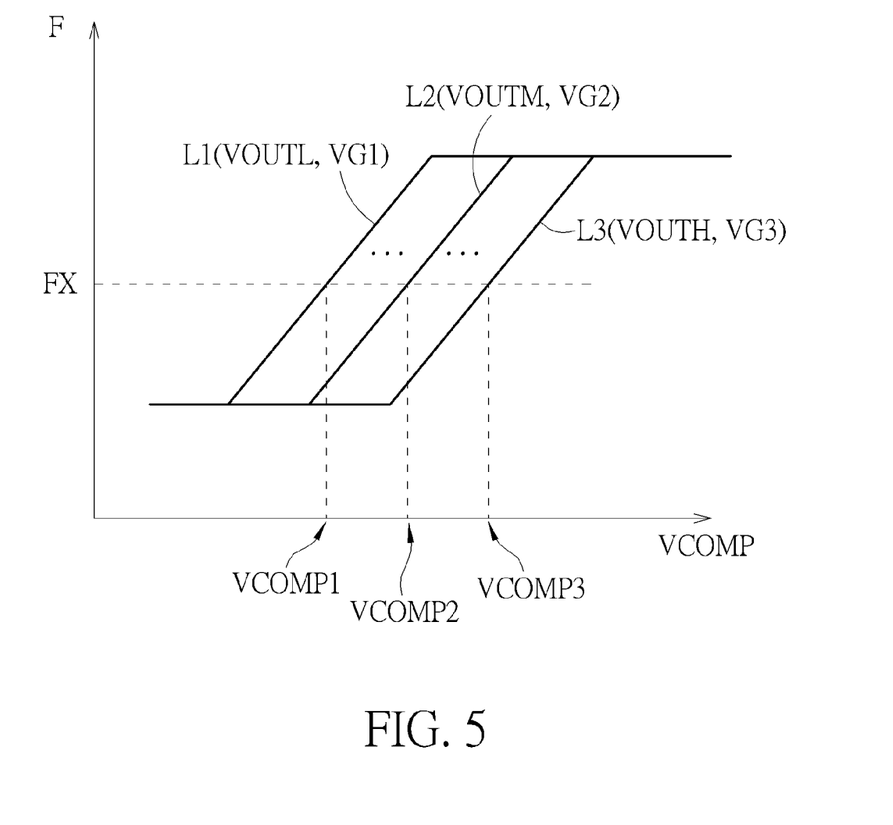
FIG. 5 is a diagram illustrating the relationship between the frequency of the gate control signal and the compensation voltage.

As shown in FIG. 2, the second current source 20448 has a first terminal and a second terminal, wherein the first terminal of the second current source 20448 is used for receiving a second voltage V2, the second terminal of the second current source 20448 is coupled to the third terminal of the second P type metal-oxide-semiconductor transistor 20446, and the first voltage V1 can be equal to or different from the second voltage V2. The third current source 20450 has a first terminal and a second terminal, wherein the first terminal of the third current source 20450 is coupled to the third terminal of the second P type metal-oxide-semiconductor transistor 20446, and the second terminal of the third current source 20450 is coupled to the ground GND. The second capacitor 20452 has a first terminal and a second terminal, wherein the first terminal of the second capacitor 20452 is coupled to the third terminal of the second P type metal-oxide-semiconductor transistor 20446, and the second terminal of the second capacitor 20452 is coupled to the ground GND. As shown in FIG. 2, because the second current source 20448 can provide a fixed current I2, the fixed current I2 and the corresponding current I1 can charge the second capacitor 20452 together to generate a control voltage VC, wherein the control voltage VC is used for controlling a frequency of an oscillator (not shown in FIG. 2) within a gate control signal generation unit 212 of the controller 200, and a current provided by the third current source 20450 is equal to a sum of the fixed current I2 and the corresponding current I1. Because the corresponding current I1 is changed with the output voltage VOUT of the power converter 100 accordingly, the control voltage VC is also changed with the output voltage VOUT of the power converter 100 accordingly, resulting in a frequency F of the gate control signal GCS (controlled by the oscillator within the gate control signal generation unit 212) generated by the gate control signal generation unit 212 being also changed with the output voltage VOUT of the power converter 100 accordingly (as shown in FIG. 5), wherein FIG. 5 is a diagram illustrating a relationship between the frequency F of the gate control signal GCS and the compensation voltage VCOMP. In addition, the present invention is not limited to a structure of the adjustment unit 204. That is to say, any configuration in which a function unit can generate the control voltage VC changed with the output voltage VOUT of the power converter 100 according to the sampling voltage VG falls within the scope of the present invention.

In addition, a relationship between the output voltage VOUT and an input voltage VIN of the primary side PRI of the power converter 100 can be determined according to equation (1):

$$\frac{VOUT}{VIN} = N \times \frac{D}{1-D} \quad (1)$$

As shown in equation (1), N represents a turns ratio of a primary winding 106 of the power converter 100 to a secondary winding 108 of the power converter 100, and D represents a duty cycle of the gate control signal GCS. Therefore, because the input voltage VIN is fixed, the controller 200 can control the duty cycle of the gate control signal GCS through equation (1) according to the compensation voltage VCOMP to increase or decrease the output voltage VOUT of the secondary side SEC of the power converter 100, wherein the controller 200 does not accurately stabilize the output voltage VOUT of the secondary side SEC of the power converter 100 at a predetermined potential according to the compensation voltage VCOMP. That is to say, the duty cycle of the gate control signal GCS can correspond to the compensation voltage VCOMP, and the compensation voltage VCOMP can correspond to the output voltage VOUT of the secondary side SEC of the power converter 100. In addition, in another embodiment of the present invention, the compensation voltage VCOMP is not changed with the output voltage VOUT of the secondary side SEC of the power converter 100 accordingly. As shown in FIG. 5, a frequency variation curve L3 of the frequency F of the gate control signal GCS corresponds to an output voltage VOUTH of the secondary side SEC of the power converter 100 and a sampling voltage VG3, a frequency variation curve L2 of the frequency F of the gate control signal GCS corresponds to an output voltage VOUTM of the secondary side SEC of the power converter 100 and a sampling voltage VG2, and a frequency variation curve L1 of the frequency F of the gate control signal GCS corresponds to an output voltage VOUTL of the secondary side SEC of the power converter 100 and a sampling voltage VG1, wherein under a given frequency FX, because a compensation voltage VCOMP1 corresponding to the frequency variation curve L1 is less than a compensation voltage VCOMP2 corresponding to the frequency variation curve L2, the compensation voltage VCOMP2 corresponding to the frequency variation curve L2 is less than a compensation voltage VCOMP3 corresponding to the frequency variation curve L3, and the compensation voltages VCOMP1, VCOMP2, VCOMP3 correspond to the output voltage VOUT of the secondary side SEC of the power converter 100, the output voltage VOUTH is greater than the output voltage VOUTM, and the output voltage VOUTM is greater than the output voltage VOUTL. In addition, because the output voltage VOUTH is greater than the output voltage VOUTM, and the output voltage VOUTM is greater than the output voltage VOUTL, the sampling voltage VG3 is greater than the sampling voltage VG2, and the sampling voltage VG2 is greater than the sampling voltage VG1.

Therefore, as shown in FIG. 5 and equation (1), under the given frequency FX, because the compensation voltage VCOMP1 is less than the compensation voltage VCOMP2, and the compensation voltage VCOMP2 is less than the compensation voltage VCOMP3 (that is, the output voltage VOUTH is greater than the output voltage VOUTM, and the output voltage VOUTM is greater than the output voltage VOUTL), the duty cycle of the gate control signal GCS corresponding to the frequency variation curve L1 is less than the duty cycle of the gate control signal GCS corresponding to the frequency variation curve L2, and the duty cycle of the gate control signal GCS corresponding to the frequency variation curve L2 is less than the duty cycle of the gate control signal GCS corresponding to the frequency variation curve L3. That is to say, the controller 200 can make the duty cycle of the gate control signal GCS be changed with the output voltage VOUT of the secondary side SEC of the power converter 100 to increase conversion efficiency of the power converter 100.

Figure 6:
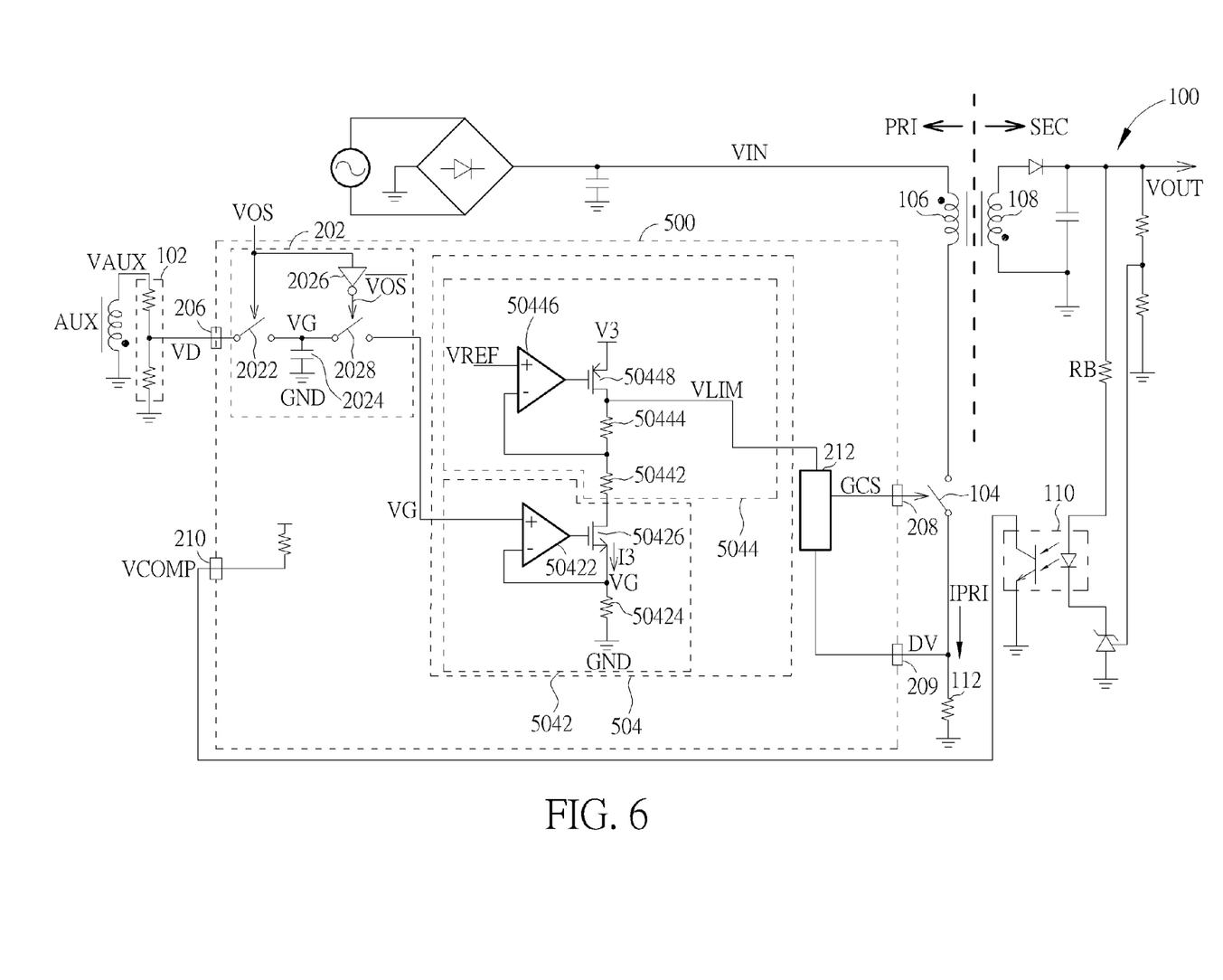
FIG. 6 is a diagram illustrating a controller of the power converter according to a second embodiment of the present invention.

Please refer to FIG. 6. FIG. 6 is a diagram illustrating a controller 500 of the power converter 100 according to a second embodiment of the present invention. As shown in FIG. 6, the controller 500 includes the sample-and-hold unit 202 and an adjustment unit 504, and the adjustment unit 504 includes a current generation module 5042 and a limit voltage generation module 5044, wherein operation of the sample-and-hold unit 202 can refer to FIG. 2, so further description thereof is omitted for simplicity. As shown in FIG. 6, the current generation module 5042 includes a third operational amplifier 50422, a resistor 50424, and a second N type metal-oxide-semiconductor transistor 50426. The third operational amplifier 50422 has a first input terminal, a second input terminal, and an output terminal, wherein the first input terminal of the third operational amplifier 50422 is coupled to the third terminal of the second switch 2028 for receiving the sampling voltage VG. The resistor 50424 has a first terminal and a second terminal, wherein the first terminal of the resistor 50424 is coupled to the second input terminal of the third operational amplifier 50422, and the second terminal of the resistor 50424 is coupled to the ground GND. The second N type metal-oxide-semiconductor transistor 50426 has a first terminal, a second terminal, and a third terminal, wherein the second terminal of the second N type metal-oxide-semiconductor transistor 50426 is coupled to the output terminal of the third operational amplifier 50422, and the third terminal of the second N type metal-oxide-semiconductor transistor 50426 is coupled to the second input terminal of the third operational amplifier 50422. As shown in FIG. 6, when the third operational amplifier 50422 operates normally, the third operational amplifier 50422 can make potential of the second input terminal of the third operational amplifier 50422 be equal to the sampling voltage VG Therefore, as shown in FIG. 6, when the third operational amplifier 50422 operates normally, the resistor 50424 can determine a corresponding current I3 flow through the second N type metal-oxide-semiconductor transistor 50426 according to the sampling voltage VG and equation (2), wherein R1 represents a resistance of the resistor 50424 in equation (2). In addition, because the sampling voltage VG corresponds to the output voltage VOUT of the power converter 100, the corresponding current I3 can also be changed with the output voltage VOUT of the power converter 100.

$$I3 = \frac{VG}{R1} \quad (2)$$

The limit voltage generation module 5044 includes a resistor 50442, a resistor 50444, a fourth operational amplifier 50446, and a third P type metal-oxide-semiconductor transistor 50448. The resistor 50442 has a first terminal and a second terminal, wherein the first terminal of the resistor 50442 is coupled to the first terminal of the second N type metal-oxide-semiconductor transistor 50426. The resistor 50444 has a first terminal and a second terminal, wherein the first terminal of the resistor 50444 is coupled to the second terminal of the resistor 50442. The fourth operational amplifier 50446 has a first input terminal, a second input terminal, and an output terminal, wherein the first input terminal of the fourth operational amplifier 50446 is used for receiving a reference voltage VREF, and the second input terminal of the fourth operational amplifier 50446 is coupled to the second terminal of the resistor 50442. The third P type metal-oxide-semiconductor transistor 50448 has a first terminal, a second terminal, and a third terminal, wherein the first terminal of the third P type metal-oxide-semiconductor transistor 50448 is coupled to the second terminal of the resistor 50444 for outputting a limit voltage VLIM, the second terminal of the third P type metal-oxide-semiconductor transistor 50448 is coupled to the output terminal of the fourth operational amplifier 50446, and the third terminal of the third P type metal-oxide-semiconductor transistor 50448 is used for receiving a third voltage V3.

As shown in FIG. 6, when the fourth operational amplifier 50446 operates normally, the fourth operational amplifier 50446 can make potential of the second input terminal of the fourth operational amplifier 50446 be equal to the reference voltage VREF. Therefore, as shown in FIG. 6, when the fourth operational amplifier 50446 operates normally, because a current flowing through the resistor 50444 is equal to the corresponding current I3, the limit voltage VLIM outputted by the first terminal of the third P type metal-oxide-semiconductor transistor 50448 can be determined according to equation (3):

$$VLIM = VREF + (I3 \times R2) \quad (3)$$
$$= VREF + \left(\frac{VG}{R1} \times R2\right)$$

In equation (3), R2 represents a resistance of the resistor 50444. As shown in equation (3), because the resistance R1 of the resistor 50424, the resistance R2 of the resistor 50444, and the reference voltage VREF are fixed, the limit voltage VLIM can be changed with the sampling voltage VG accordingly. That is to say, the limit voltage VLIM can also be changed with the output voltage VOUT of the power converter 100 accordingly. As shown in FIG. 6, a gate control signal generation unit 212 of the controller 500 can limit the current IPRI flowing through the power switch 104 of the primary side PRI of the power converter 100 according to the detection voltage DV and the limit voltage VLIM, wherein the gate control signal generation unit 212 of the controller 500 receives the detection voltage DV through a current detection pin 209 of the controller 500. Because the detection voltage DV is determined by the current IPRI and the resistor 112 (that is, the detection voltage DV corresponds to the current IPRI), the gate control signal generation unit 212 of the controller 500 can disable the gate control signal GCS to limit the current IPRI flowing through the power switch 104 when the detection voltage DV is greater than the limit voltage VLIM. Thus, because the limit voltage VLIM can be changed with the output voltage VOUT of the power converter 100 accordingly, the controller 500 can adjust a current value corresponding to overcurrent protection of the power converter 100 accordingly according to the limit voltage VLIM. In addition, the present invention is not limited to a structure of the adjustment unit 504. That is to say, any configuration in which a function unit can generate the limit voltage VLIM changed with the output voltage VOUT of the power converter 100 according to the sampling voltage VG falls within the scope of the present invention.

Figure 7:
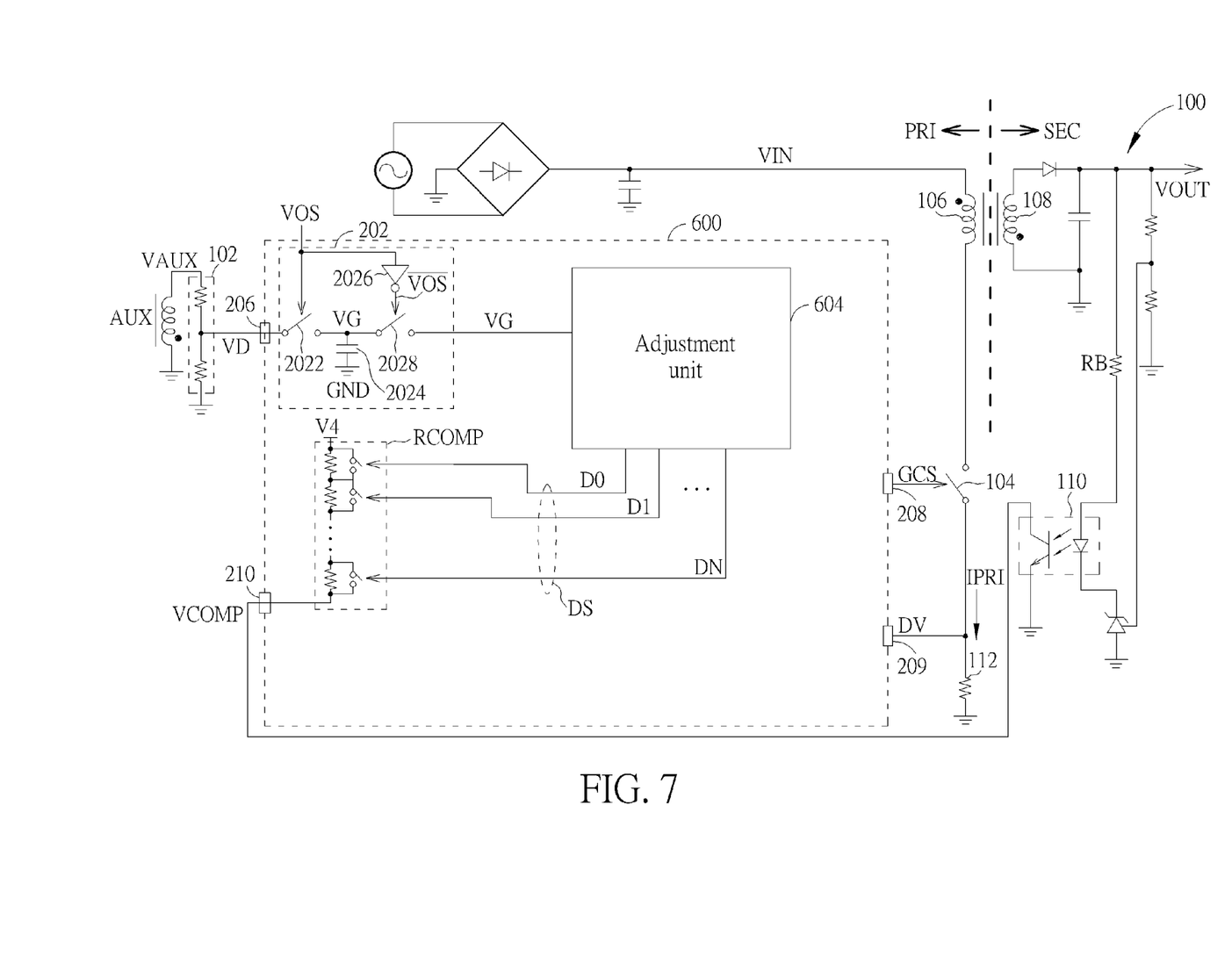
FIG. 7 is a diagram illustrating a controller of the power converter according to a third embodiment of the present invention.

Please refer to FIG. 7. FIG. 7 is a diagram illustrating a controller 600 of the power converter 100 according to a third embodiment of the present invention. As shown in FIG. 7, the controller 600 includes the sample-and-hold unit 202 and an adjustment unit 604, and the adjustment unit 604 is an analog/digital converter, wherein the operation of the sample-and-hold unit 202 can refer to FIG. 2, so further description thereof is omitted for simplicity. As shown in FIG. 7, a compensation resistor RCOMP within the controller 600 is coupled between a compensation pin 210 of the controller 600 and a fourth voltage V4, the adjustment unit 604 can generate a digital signal DS with N bits according to the sampling voltage VG (e.g. the N bits of the digital signal DS are D0, D1, ..., DN, respectively, wherein each of D0, D1, ..., DN is 0 or 1), and the digital signal DS can be used for determining a resistance of the compensation resistor RCOMP, wherein the resistance of the compensation resistor RCOMP can be changed with the sampling voltage VG accordingly. In addition, a direct current (DC) gain DCGAIN of the power converter 100 can be determined according to equation (4):

$$DCGAIN = CTR \times \frac{RCOMP}{RB} \quad (4)$$

As shown in equation (4), RB represents a resistor coupled to a photo coupler 110 of the power converter 100, and CTR represents a ratio corresponding to the photo coupler 110. As shown in equation (4), because the resistor RB and the ratio CTR are fixed, the DC gain DCGAIN can be changed with the compensation resistor RCOMP. That is to say, the DC gain DCGAIN can be changed with the sampling voltage VG accordingly. Thus, the DC gain DCGAIN can be changed with the output voltage VOUT of the power converter 100 accordingly. Therefore, because the DC gain DCGAIN can be changed with the output voltage VOUT of the power converter 100 accordingly, the controller 600 can adjust stability of the power converter 100 according to the DC gain DCGAIN accordingly.

In addition, although the controller 200 can adjust the frequency F of the gate control signal GCS according to the sampling voltage VG, the controller 500 can adjust the current IPRI flowing through the primary side of the power converter 100 according to the sampling voltage VG, and the controller 600 can adjust the stability of the power converter 100 according to the sampling voltage VG. But, in another embodiment of the present invention, a controller of the power converter 100 can adjust at least one of the frequency F of the gate control signal GCS, the current IPRI flowing through the primary side of the power converter 100, and the stability of the power converter 100 according to the sampling voltage VG.

Figure 8:
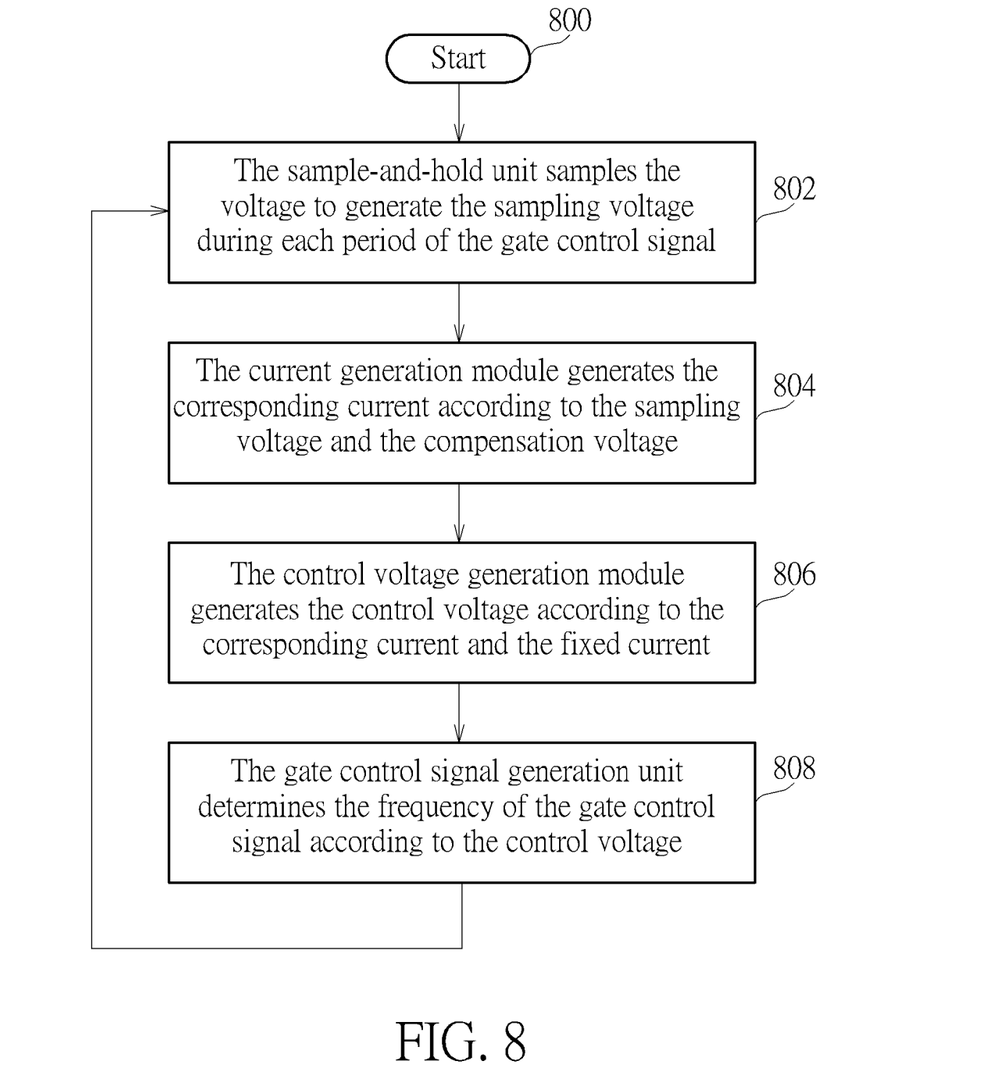
FIG. 8 is a flowchart illustrating an operation method of a controller of a power converter according to a fourth embodiment.

Please refer to FIGS. 2, 3, 5, 8. FIG. 8 is a flowchart illustrating an operation method of a controller of a power converter according to a fourth embodiment. The operation method in FIG. 8 is illustrated using the power converter 100 and the controller 200 in FIG. 2. Detailed steps are as follows:

Step 800: Start.
Step 802: The sample-and-hold unit 202 samples the voltage VD to generate the sampling voltage VG during each period of the gate control signal GCS.
Step 804: The current generation module 2042 generates the corresponding current I1 according to the sampling voltage VG and the compensation voltage VCOMP.
Step 806: The control voltage generation module 2044 generates the control voltage VC according to the corresponding current I1 and the fixed current I2.
Step 808: The gate control signal generation unit 212 determines the frequency F of the gate control signal GCS according to the control voltage VC, go to Step 802.

In Step 802, as shown in FIG. 2, when the first switch 2022 is turned on according to the pulse signal VOS, the first switch 2022 can sample the voltage VD to generate the sampling voltage VG according to the pulse signal VOS, and when the second switch 2028 is turned on according to the inverse pulse signal $\overline{VOS}$, the second switch 2028 can output the sampling voltage VG, wherein the voltage VD corresponds to the auxiliary voltage VAUX of the auxiliary winding AUX of the primary side of the power converter 100, the auxiliary voltage VAUX corresponds to the output voltage VOUT of the secondary side SEC of the power converter 100 (that is, the voltage VD corresponds to the output voltage VOUT of the secondary side SEC of the power converter 100), and the timings of the gate control signal GCS, the pulse signal VOS, and the voltage VD can refer to FIG. 3. Because the voltage VD corresponds to the output voltage VOUT of the power converter 100, the sampling voltage VG also corresponds to the output voltage VOUT of the power converter 100. In addition, as shown in FIG. 4, in another embodiment of the present invention, the sample-and-hold unit 202 receives the voltage VD through the current detection pin 209 of the controller 200 during disabling of the gate control signal GCS (that is, the current detection pin 209 of the controller 200 is further used for receiving the detection voltage DV during enabling of the gate control signal GCS, wherein the detection voltage DV is determined by the current IPRI flowing through the power switch 104 of the primary side PRI of the power converter 100 and the resistor 112), wherein as shown in FIG. 4, the voltage VD corresponds to the auxiliary voltage VAUX of the auxiliary winding AUX of the primary side PRI of the power converter 100, and the auxiliary voltage VAUX corresponds to the output voltage VOUT of the secondary side SEC of the power converter 100.

In Step 804, as shown in FIG. 2, when the first operational amplifier 20422 and the second operational amplifier 20426 operate normally, the resistor 20424 can determine the corresponding current I1 flowing through the first N type metal-oxide-semiconductor transistor 20428 according to the compensation voltage VCOMP and the sampling voltage VG, wherein because the sampling voltage VG corresponds to the output voltage VOUT of the power converter 100, the corresponding current I1 is also changed with the output voltage VOUT of the power converter 100 accordingly.

In Step 806 and Step 808, as shown in FIG. 2, the control voltage generation module 2044 can utilize the fixed current I2 provided by the second current source 20448 and the corresponding current I1 to charge the second capacitor 20452 together to generate the control voltage VC, wherein the control voltage VC can control the frequency of the oscillator within the gate control signal generation unit 212 the controller 200 (not shown in FIG. 2). Because the corresponding current I1 is changed with the output voltage VOUT of the power converter 100 accordingly, the control voltage VC is also changed with the output voltage VOUT of the power converter 100 accordingly, resulting in the frequency F of the gate control signal GCS (controlled by the oscillator within the gate control signal generation unit 212) generated by the gate control signal generation unit 212 being also changed with the output voltage VOUT of the power converter 100 accordingly (as shown in FIG. 5). As shown in FIG. 5, the frequency variation curve L3 of the frequency F of the gate control signal GCS corresponds to the output voltage VOUTH of the secondary side SEC of the power converter 100 and the sampling voltage VG3, the frequency variation curve L2 of the frequency F of the gate control signal GCS corresponds to the output voltage VOUTM of the secondary side SEC of the power converter 100 and the sampling voltage VG2, and the frequency variation curve L1 of the frequency F of the gate control signal GCS corresponds to the output voltage VOUTL of the secondary side SEC of the power converter 100 and the sampling voltage VG1, wherein under the given frequency FX, because the compensation voltage VCOMP1 corresponding to the frequency variation curve L1 is less than the compensation voltage VCOMP2 corresponding to the frequency variation curve L2, the compensation voltage VCOMP2 corresponding to the frequency variation curve L2 is less than the compensation voltage VCOMP3 corresponding to the frequency variation curve L3, and the compensation voltages VCOMP1, VCOMP2, VCOMP3 correspond to the output voltage VOUT of the secondary side SEC of the power converter 100, the output voltage VOUTH is greater than the output voltage VOUTM, and the output voltage VOUTM is greater than the output voltage VOUTL. In addition, because the output voltage VOUTH is greater than the output voltage VOUTM, and the output voltage VOUTM is greater than the output voltage VOUTL, the sampling voltage VG3 is greater than the sampling voltage VG2, and the sampling voltage VG2 is greater than the sampling voltage VG1. Therefore, as shown in FIG. 5 and equation (1), under the given frequency FX, because the compensation voltage VCOMP1 is less than the compensation voltage VCOMP2, and the compensation voltage VCOMP2 is less than the compensation voltage VCOMP3 (that is, the output voltage VOUTH is greater than the output voltage VOUTM, and the output voltage VOUTM is greater than the output voltage VOUTL), the duty cycle of the gate control signal GCS corresponding to the frequency variation curve L1 is less than the duty cycle of the gate control signal GCS corresponding to the frequency variation curve L2, and the duty cycle of the gate control signal GCS corresponding to the frequency variation curve L2 is less than the duty cycle of the gate control signal GCS corresponding to the frequency variation curve L3. That is to say, the controller 200 can make the duty cycle of the gate control signal GCS be changed with the output voltage VOUT of the secondary side SEC of the power converter 100 to increase the conversion efficiency of the power converter 100.

Figure 9:
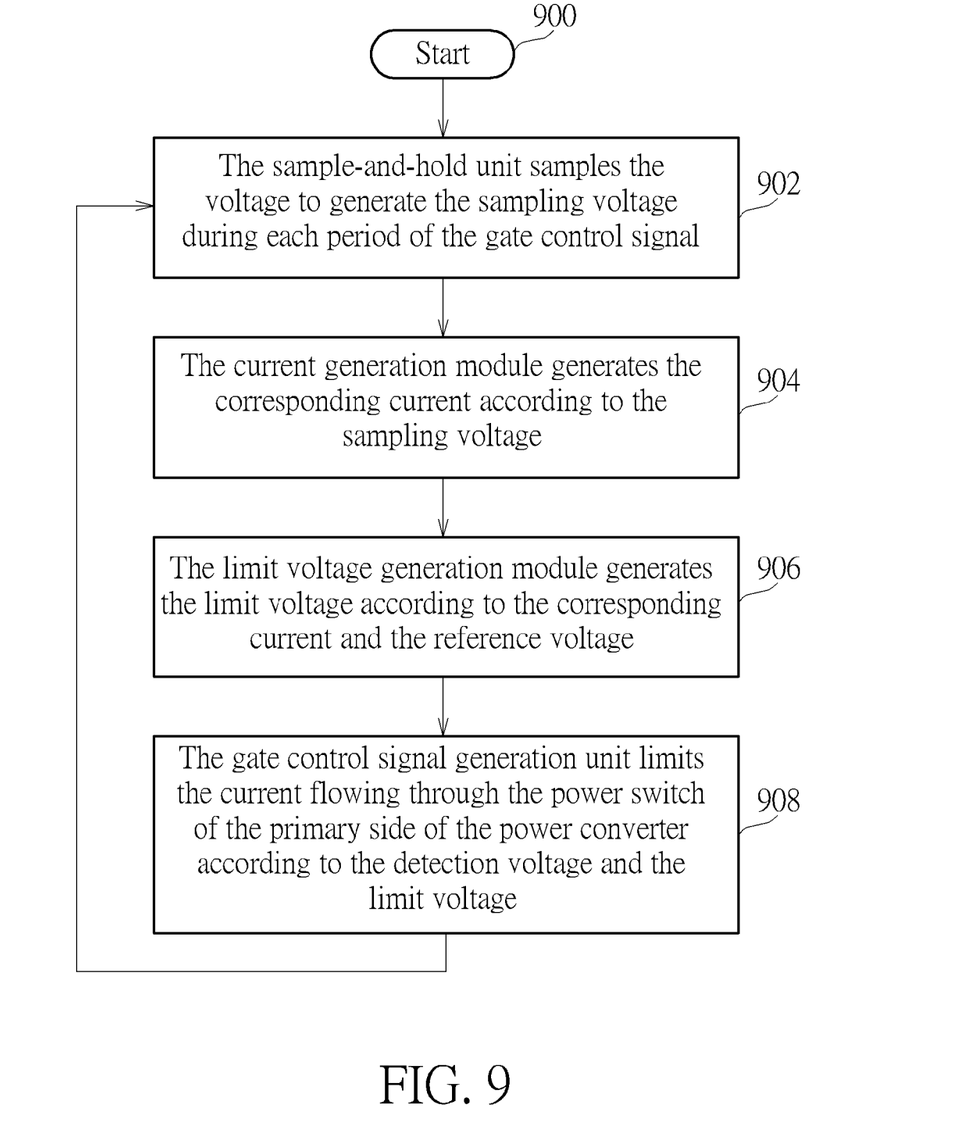
FIG. 9 is a flowchart illustrating an operation method of a controller of a power converter according to a fifth embodiment.

Please refer to FIGS. 6, 9. FIG. 9 is a flowchart illustrating an operation method of a controller of a power converter according to a fifth embodiment. The operation method in FIG. 9 is illustrated using the power converter 100 and the controller 500 in FIG. 6. Detailed steps are as follows:

Step 900: Start.

Step 902: The sample-and-hold unit 202 samples the voltage VD to generate the sampling voltage VG during each period of the gate control signal GCS.

Step 904: The current generation module 5042 generates the corresponding current I3 according to the sampling voltage VG.

Step 906: The limit voltage generation module 5044 generates the limit voltage VLIM according to the corresponding current I3 and the reference voltage VREF.

Step 908: The gate control signal generation unit 212 limits the current IPRI flowing through the power switch 104 of the primary side PRI of the power converter 100 according to the detection voltage DV and the limit voltage VLIM, go to Step 902.

In Step 904, as shown in FIG. 6, when the third operational amplifier 50422 operates normally, the resistor 50424 can generate the corresponding current I3 flow through the second N type metal-oxide-semiconductor transistor 50426 according to the sampling voltage VG and equation (2), wherein because the sampling voltage VG corresponds to the output voltage VOUT of the power converter 100, the corresponding current I3 can also be changed with the output voltage VOUT of the power converter 100.

In Step 906, as shown in FIG. 6, when the fourth operational amplifier 50446 operates normally, the fourth operational amplifier 50446 can make the potential of the second input terminal of the fourth operational amplifier 50446 be equal to the reference voltage VREF. Therefore, as shown in FIG. 6, when the fourth operational amplifier 50446 operates normally, because the current flowing through the resistor 50444 is equal to the corresponding current I3, the limit voltage VLIM outputted by the first terminal of the third P type metal-oxide-semiconductor transistor 50448 can be determined according to equation (3). Because the resistance R1 of the resistor 50424, the resistance R2 of the resistor 50444, and the reference voltage VREF are fixed, the limit voltage VLIM can be changed with the sampling voltage VG accordingly. That is to say, the limit voltage VLIM can also be changed with the output voltage VOUT of the power converter 100 accordingly.

In Step 908, as shown in FIG. 6, the gate control signal generation unit 212 of the controller 500 can limit the current IPRI flowing through the power switch 104 of the primary side PRI of the power converter 100 according to the detection voltage DV and the limit voltage VLIM. Because the detection voltage DV is determined by the current IPRI and the resistor 112 (that is, the detection voltage DV corresponds to the current IPRI), the gate control signal generation unit 212 of the controller 500 can disable the gate control signal GCS to limit the current IPRI flowing through the power switch 104 when the detection voltage DV is greater than the limit voltage VLIM. Thus, because the limit voltage VLIM can be changed with the output voltage VOUT of the power converter 100 accordingly, the controller 500 can adjust the current value corresponding to the over-current protection of the power converter 100 accordingly according to the limit voltage VLIM.

Figure 10:
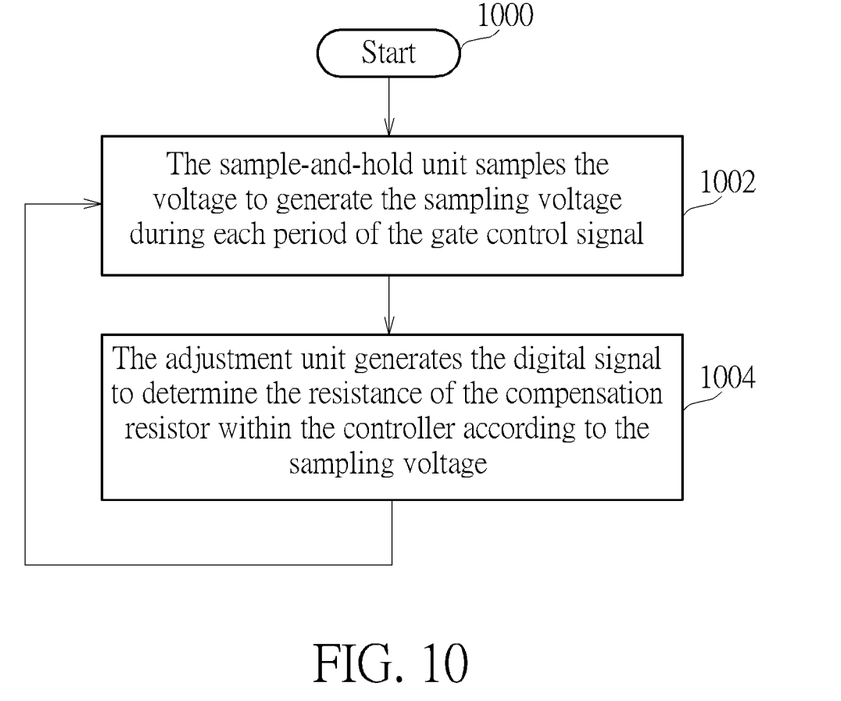
FIG. 10 is a flowchart illustrating an operation method of a controller of a power converter according to a sixth embodiment.

Please refer to FIGS. 7, 10. FIG. 10 is a flowchart illustrating an operation method of a controller of a power converter according to a sixth embodiment. The operation method in FIG. 10 is illustrated using the power converter 100 and the controller 600 in FIG. 7. Detailed steps are as follows:

Step 1000: Start.

Step 1002: The sample-and-hold unit 202 samples the voltage VD to generate the sampling voltage VG during each period of the gate control signal GCS.

Step 1004: The adjustment unit 604 generates the digital signal DS to determine the resistance of the compensation resistor RCOMP within the controller 600 according to the sampling voltage VG, go to Step 1002.

A difference between the embodiment in FIG. 10 and the embodiment in FIG. 8 is that in Step 1004, as shown in FIG. 7, the adjustment unit 604 (the analog/digital converter) can generate the digital signal DS with N bits according to the sampling voltage VG (e.g. the Nbits of the digital signal DS are D0, D1, . . . , DN, respectively, wherein each of D0, D1, . . . , DN is 0 or 1), and the digital signal DS can be used for determining the resistance of the compensation resistor RCOMP, wherein the resistance of the compensation resistor RCOMP can be changed with the sampling voltage VG accordingly. As shown in equation (4), the DC gain DCGAIN can be changed with the compensation resistor RCOMP. That is to say, the DC gain DCGAIN can also be changed with the sampling voltage VG accordingly. Thus, the DC gain DCGAIN can be changed with the output voltage VOUT of the power converter 100 accordingly. Therefore, because the DC gain DCGAIN can be changed with the output voltage VOUT of the power converter 100 accordingly, the controller 600 can adjust the stability of the power converter 100 accordingly according to the DC gain DCGAIN.

To sum up, the controller of the power converter and the operation method thereof utilize the sample-and-hold unit to generate the sampling voltage changed with the output voltage of the power converter accordingly, and utilize the adjustment unit to adjust at least one of the frequency of the gate control signal, the current flowing through the primary side of the power converter, and the resistance of the compensation resistor of the controller according to the sampling voltage. Therefore, compared to the prior art, the present invention can adjust at least one of the conversion efficiency of the power converter, the current value corresponding to the over-current protection of the power converter, and the stability of the power converter with the output voltage of the power converter accordingly.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A controller of a power converter, wherein the power converter is applied to a Universal Serial Bus (USB) power delivery adapter system, the controller comprising:
a sample-and-hold unit for sampling a voltage to generate a sampling voltage during each period of a gate control signal, wherein the sampling voltage corresponds to an output voltage of the power converter; and
an adjustment unit coupled to the sample-and-hold unit, wherein the adjustment unit comprises:
a current generation module for generating a corresponding current according to the sampling voltage and a compensation voltage, wherein the compensation voltage is generated directly according to the output voltage of the power converter; and
a control voltage generation module for generating a control voltage according to the corresponding current and a fixed current, wherein the control voltage is used for determining a frequency of the gate control signal.

2. The controller of claim 1, wherein the gate control signal is used for controlling turning on and turning off of a power switch of the primary side of the power converter.

3. The controller of claim 1, further comprising:
an auxiliary pin for receiving the voltage, wherein the voltage corresponds to an auxiliary voltage of an auxiliary winding of the primary side of the power converter, and the auxiliary voltage corresponds to the output voltage of the power converter.

4. The controller of claim 1, further comprising:
a compensation pin, wherein the compensation resistor is coupled to the compensation pin.

5. The controller of claim 1, further comprising:
a current detection pin for receiving the voltage, wherein the voltage corresponds to an auxiliary voltage of an auxiliary winding of the primary side of the power converter, and the auxiliary voltage corresponds to the output voltage of the power converter.

6. The controller of claim 1, further comprising:
a compensation pin for receiving the compensation voltage.

7. A controller of a power converter, wherein the power converter is applied to a Universal Serial Bus (USB) power delivery adapter system, the controller comprising:
a sample-and-hold unit for sampling a voltage to generate a sampling voltage during each period of a gate control signal, wherein the sampling voltage corresponds to an output voltage of the power converter; and
an adjustment unit coupled to the sample-and-hold unit, wherein the adjustment unit comprises:
a current generation module for generating a corresponding current according to the sampling voltage, wherein the current generation module comprises an operational amplifier and a metal-oxide-semiconductor transistor coupled to the operational amplifier; and
a limit voltage generation module for generating a limit voltage according to the corresponding current and a reference voltage, wherein the limit voltage is used for limiting a current flowing through a primary side of the power converter.

8. A controller of a power converter, wherein the power converter is applied to a Universal Serial Bus (USB) power delivery adapter system, the controller comprising:
a sample-and-hold unit for sampling a voltage to generate a sampling voltage during each period of a gate control signal, wherein the sampling voltage corresponds to an output voltage of the power converter;
an adjustment unit coupled to the sample-and-hold unit, wherein the adjustment unit comprises:
an analog/digital converter for generating a digital signal according to the sampling voltage, wherein the digital signal is used for determining a resistance of a compensation resistor of the controller, and the sampling voltage corresponds to an auxiliary voltage of an auxiliary winding of a primary side of the power converter; and
a compensation resistor coupled to an output of a secondary side of the power converter.

9. An operation method of a controller of a power converter, wherein the power converter is applied to a USB power delivery adapter system, and the controller comprises a sample-and-hold unit and an adjustment unit, and the adjustment unit comprises a current generation module and a control voltage generation module, the operation method comprising:
the sample-and-hold unit sampling a voltage to generate a sampling voltage during each period of a gate control signal, wherein the sampling voltage corresponds to an output voltage of the power converter;

the current generation module generating a corresponding current according to the sampling voltage and a compensation voltage, wherein the compensation voltage is generated directly according to the output voltage of the power converter; and the control voltage generation module generating a control voltage according to the corresponding current and a fixed current, wherein the control voltage is used for determining a frequency of the gate control signal.

10. The operation method of claim 9, wherein the gate control signal is used for controlling turning on and turning off of a power switch of the primary side of the power converter.

11. The operation method of claim 9, wherein the voltage corresponds to an auxiliary voltage of an auxiliary winding of the primary side of the power converter, and the auxiliary voltage corresponds to the output voltage of the power converter.

12. The operation method of claim 9, wherein the compensation resistor is coupled to a compensation pin further comprised in the controller.

13. An operation method of a controller of a power converter, wherein the power converter is applied to a USB power delivery adapter system, and the controller comprises a sample-and-hold unit and an adjustment unit, and the adjustment unit comprises a current generation module and a limit voltage generation module, the operation method comprising:

the sample-and-hold unit sampling a voltage to generate a sampling voltage during each period of a gate control signal, wherein the sampling voltage corresponds to an output voltage of the power converter;

the current generation module generating a corresponding current according to the sampling voltage, wherein the current generation module comprises an operational amplifier and a metal-oxide-semiconductor transistor coupled to the operational amplifier; and the limit voltage generation module generating a limit voltage according to the corresponding current and a reference voltage, wherein the limit voltage is used for limiting a current flowing through a primary side of the power converter.

14. An operation method of a controller of a power converter, wherein the power converter is applied to a USB power delivery adapter system, and the controller comprises a sample-and-hold unit, an adjustment unit, and a compensation resistor, and the adjustment unit comprises an analog/digital converter, the operation method comprising:

the sample-and-hold unit sampling a voltage to generate a sampling voltage during each period of a gate control signal, wherein the sampling voltage corresponds to an output voltage of the power converter; and the analog/digital converter generating a digital signal according to the sampling voltage, wherein the digital signal is used for determining a resistance of a compensation resistor of the controller, and the sampling voltage corresponds to an auxiliary voltage of an auxiliary winding of a primary side of the power converter;

wherein the compensation resistor is coupled to an output of a secondary side of the power converter.

* * * * *